May 18, 1937.  P. ROBINSON  2,081,068
ELECTROLYTIC DEVICE
Filed Aug. 18, 1934
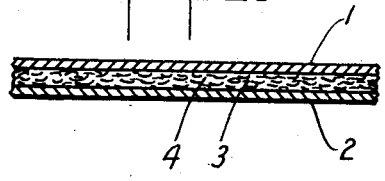
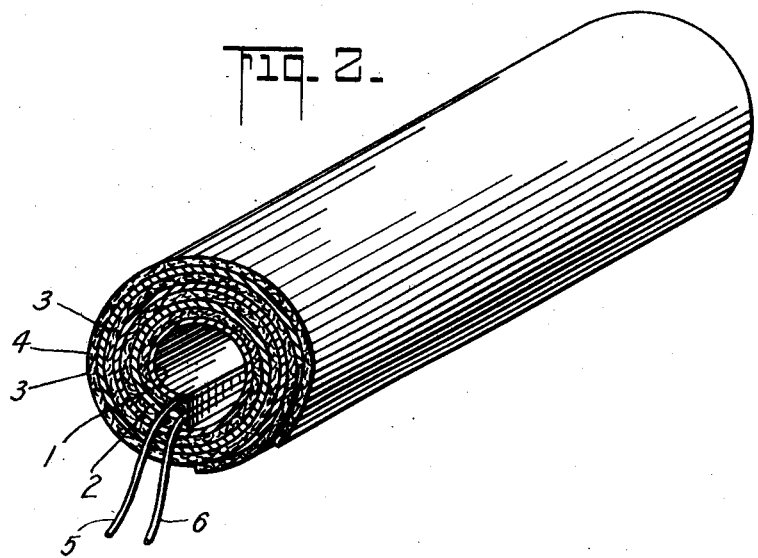
PRESTON ROBINSON
INVENTOR
BY Dorsey + Cole
ATTORNEYS Patented May 18, 1937

2,081,068

UNITED STATES PATENT OFFICE 2,081,068

ELECTROLYTIC DEVICE

Preston Robinson, Williamstown, Mass., assignor to Sprague Specialties Company, North Adams, Mass., a corporation of Massachusetts Application August 18, 1934, Serial No. 740,487

13 Claims. (Cl. 175—315)

The present invention relates to electrolytic condensers of the so-called dry type, and more particularly to such condensers having absorbent paper spacers and to the process of manufacturing such condensers.

Electrolytic condensers of the dry type consist, as a rule, of two cooperating electrodes in the form of foils or sheets of which both are of filming metal, as aluminum, tantalum, zirconium, etc., and at least one of the electrodes of filming metal is provided with a film. The condenser comprises a more or less viscous electrolyte, the consistency of the electrolyte ranging from slightly viscous to a heavy paste. As a rule the electrodes are separated by absorbent spacers, also serving as carriers for the electrolyte.

The electrolyte usually comprises an ionogen, which is usually a weak acid, as boric acid, phosphoric acid, citric acid, etc., preferably in combination with a salt of a weak acid, usually an alkaline salt of such weak acid. The acid of the salt, however, does not need to be the same as the acid of the electrolyte. The electrolyte also comprises an ionizing solvent, which usually consists of a polyhydric alcohol, as glycerol, ethylene glycol, etc., and of a certain amount of water. Furthermore, the electrolyte may comprise one or more inert substances, usually to increase its viscosity and/or conductivity.

As spacer material in the past almost exclusively meshed fabric spacers, in the form of gauze has been used, and in high quality condensers, especially those required to stand voltages of 450 volts and more, specially purified gauze had to be used. Gauze, especially such purified gauze, is a comparatively expensive material for such use, and besides that has various other drawbacks, for instance that it cannot be obtained commercially in thicknesses below .005", and that its thickness varies to a considerable extent. Efforts have been made for several years to replace the gauze by a material which is less expensive, does not require special purification and which can be obtained also in smaller thicknesses and the thickness of which is uniform.

All of these properties can be obtained in paper and are inherent in good-quality condenser paper. The price of such paper is considerably below that of gauze. It can be obtained in any desired thickness from a fraction of a mil to several mils, and is also a material of great purity, void of all constituents which would harm or harmfully react with the usual electrolytes of dry electrolytic condensers.

Various attempts have therefore been made in the past to use paper as the material for the spacers of dry electrolytic condensers. However, such efforts have generally failed and while paper spacers have been used to some extent in dry electrolytic condensers for quite low voltages, below 25 volts, paper spacers were found unsatisfactory for the most generally used dry electrolytic condensers, which are required to stand voltages of 100 to 600 volts and more.

A series of tests which I have undertaken to determine the cause of such lack of success with paper spacers, have conclusively shown, that the failure in the past to obtain satisfactory dry electrolytic condensers with paper spacers is due to a phenomenon to which I shall refer as the swelling of the paper, and which prevented the proper impregnation of the paper with the electrolyte.

The swelling of the paper can be explained as follows:

Paper can be considered as a mass of fibrous material possessing colloidal properties. These colloidal properties of the fibrous material of the paper so counteract the absorbent properties of the paper, that the latter can manifest themselves to their full extent only after the fibers have expanded to a definite extent, determined by the structure of the fibrous material.

On the other hand, the electrolytes used in dry electrolytic condensers contain polar molecules, for instance, the polar molecules of the polyhydric alcohol and of the water contained in the electrolyte. In the presence of polar molecules the fiber of the paper, due to the above colloidal properties of the paper, is required first to swell or expand to a definite extent, before the absorbing properties can be fully effective.

In the past the impregnation of the paper spacer of dry electrolytic condensers has been attempted in two manners, neither of which utilized the full absorbing capacity of the paper.

According to one process of impregnation, the electrolyte was applied to the paper in a manner similar to that used with gauze spacers, whereby a viscous, usually pasty electrolyte was smeared or coated on the paper prior to its assembly into the condenser. Such a process provides only a surface coating of the paper with the electrolyte, with little of the electrolyte filling out the pores of the paper. When such electrolyte-coated paper spacers were used in condensers, the condensers had poor characteristics, especially a short life, as the interior of the paper did not swell and thus an insufficient amount of electrolyte was absorbed.

According to the second process, also similar to one successfully used with gauze spacers, the condenser was first assembled, usually wound into a roll, and then impregnated with electrolyte.

The first effect which hereby takes place when using paper spacers is the swelling of the paper. This results in a tremendous pressure being developed internally in the condenser, with the result that this high internal pressure prevents the complete absorption of the electrolyte by the paper, especially in the inner portions of the condenser. Again, the condensers because of insufficient impregnation of the paper with electrolyte gave poor performance and had unstable characteristics.

I have found that dry electrolytic condensers having at least the same desirable properties as gauze-spacer condensers can be obtained with paper spacers, provided the paper is brought in a condition in which its full absorbing capacity can be utilized. This I obtain by first swelling the paper to such extent that the fibers of the paper are fully expanded before their impregnation with the electrolyte.

According to my invention, I swell the paper to its maximum extent in a chemical having polar molecules, for instance, in water or alcohol, or in the electrolyte in which it is to be impregnated.

The paper used for this purpose can be either a kraft or a cotton paper of the type used for wax or oil-impregnated condensers, or can be special types of cotton or mulberry or Japan paper having relatively long fibers. As a rule I prefer to use mulberry paper because of its good absorbing properties and in a thickness of 1 to 2 mils, and place a single layer of this paper between the opposing electrodes.

The swelling and subsequent absorption to such a maximum extent, means a considerable increase in the thickness of the paper depending upon the length of the fibres. For instance, for kraft paper of the ordinary grade this swelling amounts to almost 100%, i. e., to double the thickness; with cotton or mulberry paper the swelling and absorption may have considerably less effect on the thickness.

To pre-swell the paper for the purpose of obtaining its maximum absorbent properties I use one of the following methods:

The paper is swelled by immersion in a polar liquid, for instance in water or alcohol, or in the electrolyte to be used. After the paper has been swelled to its full extent, it is assembled with the electrodes (the filmed electrode or electrodes are preferably preformed), for instance, by winding them together into a roll. The condenser roll is then impregnated with the electrolyte by one of the processes described in my copending application Ser. No. 690,142, filed Sept. 19, 1933, and the copending application Ser. No. 754,668, filed November 23, 1934, of Preston Robinson and Joseph L. Collins.

The assembly of the condensers should take place preferably immediately or at least shortly after the swelling of the paper. However, the impregnation of the condenser assembly does not need to take place immediately after it has been assembled—although I prefer such practice—for even when the condenser assembly is left standing in air, and the pre-swollen paper shrinks, the loss in swelling liquid and shrinkage of paper will leave sufficient voids to permit the paper to reswell in the electrolyte to its full extent without developing excess pressure which would prevent proper access of the electrolyte. The procedure of pre-swelling the paper, assembling the pre-swollen paper into a condenser and then letting it stand in air before its final impregnation, however, should be distinguished from a process of merely loosely winding a non-pre-swollen paper spacer. When pre-swollen paper is assembled with the electrodes into a condenser, for instance, wound into a roll, the pre-swollen paper spacer determines uniformly throughout the condenser, the proper inter-space which is to exist between the electrode foils, to obtain the best results when the condenser assembly is subjected to impregnation.

On the other hand, a mere loose winding of the condenser with paper which is not pre-swollen does not uniformly determine the desired interspace between the electrode foils. When such a loosely wound condenser assembly is subjected to impregnation, between some of the turns there will be sufficient space for the paper to fully swell and exhibit its absorptive properties to their full extent, but in addition an excess of electrolyte will be interposed between the electrode foils, which electrolyte is not bound to and carried by the spacer. This excess electrolyte promotes the "bleeding" of the condenser, as will hereafter be explained. Between other turns insufficient space may exist for the paper to fully swell up when subjected to impregnation, with the result that such portions of the condenser will exhibit poor properties, which correspondingly lower the all-around performance of the condenser. These latter portions also have a lower breakdown voltage and the breakdown voltage of the condenser is considerably lowered because of such poor spots.

Referring now to the "bleeding" of the condenser; it should be noted that in a condenser which has been assembled with pre-swollen paper, all of the electrolyte is carried by and is bound to the paper even if an air-drying of the wound condenser takes place before impregnation. When such a condenser is subjected to temperatures at which the electrolyte becomes highly liquid it will lose practically none of its electrolyte because it is bound by the spacer.

On the other hand, a condenser which is loosely wound with paper which has not been pre-swollen will lose at elevated temperatures a considerable portion of its electrolyte. In the operation of the condensers, conditions are frequently such that the temperature of the condenser reaches sufficiently high values, whereby the loss of electrolyte of such loosely wound, non-swollen paper-spacer condensers is quite considerable. This "bleeding" of the condenser is highly objectionable and practically excludes the use of such condensers.

What has been said with regard to loosely wound, non-pre-swollen paper spacers applies also to a great extent to spacers which are corrugated or embossed in such a manner as to provide channels for the electrolyte and for a greater distance between the electrode foils. While in such case the swelling of the paper during impregnation may cause no great trouble, the excess of unbound electrolyte is quite large, and such condensers at elevated operating temperatures bleed to such extent as to practically exclude their use.

Instead of swelling the paper in a polar liquid, as above stated, I may swell the paper by placing it in an atmosphere saturated with vapor and comprising an excess of polar liquid as reservoir.

According to one specific embodiment of my invention I swell and impregnate the paper in a single bath, which step I combine into a continuous process with the assembly of the condenser. For this purpose, I pass the paper through a bath containing the impregnating electrolyte at a sufficiently slow speed to first permit the paper to fully swell, because of the polar action of the electrolyte, and then to absorb the electrolyte to the maximum extent possible with such swollen paper. The so-swollen and fully impregnated paper then passes to a winding machine which, together with the electrode foils, winds it into a roll.

When using this process, special care has to be taken with regard to the length of the paper immersed in the electrolyte, the time of immersion and the rate of advance, so that the paper, while in the electrolyte, be given opportunity to fully swell up and then to fully absorb the electrolyte.

In winding the pre-swollen and impregnated paper into the condenser roll, I prefer to maintain the condition of the impregnated paper spacer in the finished condenser practically unchanged with respect to its condition when it leaves the electrolyte bath.

The electrolyte bath used for swelling and impregnating the paper is preferably heated to a temperature of about 70 to 90° C. The exact temperature and the rate of advance are interdependent factors, and furthermore, depend on various other factors, as the composition of the electrolyte, quality of paper, etc. This heating not only reduces the viscosity of the electrolyte, but also increases the speed of swelling of the paper and the rate at which it absorbs the electrolyte.

The rate of advance of the paper towards the winding machine is also preferably such that without intermediate heating of the impregnated paper, the latter at the winding machine should have at least a temperature of about 40 to 50° C. If the temperature is below such values the contact resistance between the electrolyte and the electrode foil is unduly high, which brings about an increase in the series resistance and power factor of the condenser.

While the last described method is attractive as it results in a continuous operation and practically eliminates all manual labor, nevertheless, because of the rather critical adjustments of speeds and temperatures required to obtain the most satisfactory results, I prefer, especially when manufacturing condensers the characteristics of which have to meet strict specifications, to pre-swell the paper in a separate step, as has been earlier described.

The separation of the step of swelling process from that of impregnation has also the advantage of greater flexibility and higher operating speeds, and of less waste in case of interruptions in operation.

In the drawing forming part of the specification:

Figure 1 is a cross-sectional view of an element of a condenser made in accordance with my invention.

Fig. 2 is a perspective view of a condenser embodying my invention.

Referring to Figure 1, there are two electrodes 1 and 2, at least one of which is of filming metal, as aluminum, tantalum, zirconium, etc. The filming electrode is preferably electrolytically pre-formed before assembly, preferably by the method described in my copending application Ser. No. 548,270 filed July 1, 1931, now Patent No. 2,057,314.

The spacer 3, which is interposed between the electrodes 1 and 2, is pre-swollen according to one of the several methods above described and then impregnated with the electrolyte either before or after the assembly of the condenser.

The electrolyte, as stated, comprises as a rule a weak acid, and possibly the salt of a weak acid, and a polyhydrous alcohol, and preferably also water as ionizing solvent, the acid, salt and polyhydrous alcohol used being of the type previously stated. The electrolyte, as stated, may also comprise an inert substance to increase its viscosity and/or conductivity.

Due to the pre-swelling of the paper its full absorbing capacity is utilized and a thorough impregnation of the paper 3 with the electrolyte 4 can take place. The resulting condensers, irrespective of voltage and type, exhibit characteristics which are at least equal to those of high-grade condensers of the same type and using gauze spacers.

Fig. 2 shows an assembled condenser the electrodes 1 and 2 being provided with leads 5 and 6 for their outside connection. The leads may form integral extensions of the electrodes and the condenser roll is surrounded with a wrapper and/or a sealed envelope (not shown).

The condensers manufactured according to my novel process are characterized by low power factor, high breakdown voltage, high insulating resistance and good life, and compare in all of these respects highly favorably with condensers using highly purified gauze spacers. They clearly distinguish from paper-spacer condensers of the prior art, which in general had inferior properties to those of gauze spacer condensers— especially shorter life, lower breakdown voltage, excessive decrease of capacity in life, and excessive increase of series resistance and power factor on life.

Besides so distinguishing in their electrical properties, the condensers made according to my invention can also be distinguished from condensers of the prior art by physical examination. For instance, the condensers, having insufficient electrolyte because of the lack of pre-swelling of the paper, show so-called dry spots, i. e., spots which are not well impregnated and which can be usually detected by eye. In my novel condensers dry spots are entirely absent.

Compared to condensers which are loosely wound or have corrugated spacers, my condensers can be distinguished by the absence of unbound electrolyte, i. e., by the absence of bleeding of the condenser even at the highest operating temperature, which may occur in practice.

My condensers are furthermore characterized by a great uniformity of the inter-space between adjacent electrode foils, this inter-space being entirely filled up with the electrolyte-carrying paper, which is of uniform thickness throughout the entire condenser.

In my condensers the electrolyte forms no crust on the paper. Thus if a condenser is unrolled and the impregnated paper scraped, for instance, by means of a knife, together with the electrolyte, fibers of the spacer are also removed.

Furthermore if such a condenser is unwound and individual portions thereof are subjected to capacity test, it is found that the capacity is the same within 2-3%, per square inch area for any portion of the condenser.

In condensers of the prior art, which have dry spots, the power factor at such spots may be 100% higher than the overall power factor of the condenser. In condensers of my invention variations between the power factor (and series resistance) of individual portions is within 10% of the average, (this latter variation being primarily due to the well-known variations of film contact resistance and resistance in the film itself). Thus for instance, in condensers of my invention having an overall power factor of 5%, the power factor of individual portions will vary between 4.5 and 5.5%. On the other hand, in paper-spacer condensers of the prior art, which usually also have much higher power factors, for instance 10%, individual spots may have as high as 20% or higher power factors, which results in the condensers heating up locally at such spots.

While I have described my invention with regard to specific embodiments and in a specific application, I do not wish to be limited thereto, but desire the appended claims to be construed as broadly as permissible in view of the prior art.

What I claim is:

1. An electrolytic condenser of the dry type comprising two electrodes of which at least one is of filming metal, and a paper spacer interposed between said electrodes, said paper spacer being swelled to its maximum extent, and a viscous electrolyte carried by said paper spacer, said electrolyte comprising a polar liquid.

2. In an electrolytic condenser of the dry type forming a roll and comprising two electrodes of which at least one is of filming metal and is provided with a film, and a paper spacer interposed between said electrodes, said spacer being swelled to a definite extent to exhibit its maximum absorbing capacity, and a viscous electrolyte carried by said spacer, said electrolyte comprising a polar component.

3. An electrolytic condenser of the dry type comprising two electrodes, of which at least one is of filming metal and is provided with an electrolytically-formed film, a spacer of kraft paper interposed between said electrodes, said paper being swelled to over 70%, and a viscous electrolyte carried by said paper spacer, said electrolyte comprising a weak acid, a polyhydric alcohol, and water.

4. An electrolytic condenser of the dry type comprising two electrodes of which at least one is of filming metal, and a paper spacer interposed between said electrodes, said paper being swelled to over 70%, a viscous electrolyte carried by said spacer, said electrolyte forming a roll and comprising a polar liquid, the capacity of said condenser being the same per unit of electrode surface area, in any portion of the condenser, said electrolyte being strongly bound by said paper.

5. An electrolytic condenser of the dry type comprising two electrodes, of which at least one is of filming metal, said electrodes being spaced at a uniform distance from each other throughout the condenser, a paper spacer and a viscous electrolyte carried by said spacer, said electrolyte being absorbed by the spacer to the full extent of the absorbing capacity of the paper, and the entire electrolyte within the condenser being bound by said paper, said electrolyte-carrying spacer filling out the entire space between said electrodes.

6. An electrolytic condenser comprising two substantially unperforate electrodes, of which at least one is of filming metal, and a spacer interposed between said electrodes, said spacer being of mulberry paper, and a viscous electrolyte absorbed by said spacer to the full extent of the absorbing capacity of said paper, said electrolyte comprising a polar liquid and being entirely bound by said paper.

7. In the manufacture of dry electrolytic condensers having paper spacers, the process which comprises the steps, pre-swelling the paper to a definite extent and impregnating said spacer with a viscous electrolyte.

8. In the manufacture of dry electrolytic condensers having paper spacers, the process which comprises the steps, pre-swelling the paper spacer in a polar liquid and assembling the spacer with electrodes into a condenser assembly, and subsequently impregnating said pre-swelled paper with a viscous electrolyte comprising a polar liquid.

9. In the manufacture of dry electrolytic condensers having paper spacers, the process which comprises the steps, pre-swelling the paper in a viscous electrolyte, assembling said pre-swelled paper with electrodes into a condenser assembly, and impregnating said assembly in a viscous electrolyte of the same character as the first electrolyte.

10. In the manufacture of dry electrolytic condensers having paper spacers, the process which comprises the steps, passing a paper spacer through a viscous electrolyte at a rate sufficiently low to pre-swell the paper to its maximum absorbing capacity and to absorb said electrolyte to the full extent of its absorbing capacity, and subsequently winding said paper into a condenser assembly with electrodes.

11. In the manufacture of dry electrolytic condensers, the process which comprises the steps, passing a paper spacer through a bath comprising a viscous electrolyte heated to a temperature between 70° to 90° C. at a speed sufficiently slow to fully swell the paper and to cause it to absorb the electrolyte to its full absorbing capacity, advancing said paper to a winding machine and winding it together with electrodes into a condenser roll, the temperature of the electrolyte at the winding machine being about 40 to 50° C.

12. In the manufacture of dry electrolytic condensers having paper spacers, the process which comprises the steps, pre-swelling the paper spacer to its maximum extent by placing the paper in an atmosphere of saturated water vapor, assembling said paper with electrodes into a condenser assembly, and impregnating said assembly with a viscous electrolyte having a liquid polar constituent.

13. In the manufacture of a dry electrolytic condenser having paper spacers, the process which comprises the steps, pre-swelling the paper spacer to a definite extent by placing the paper in an atmosphere containing water vapor, assembling said swelled paper with electrodes into a condenser assembly and impregnating said assembly with a viscous electrolyte.

PRESTON ROBINSON.